United States Patent
Naito et al.

(12) 
(10) Patent No.: US 7,012,798 B2
(45) Date of Patent: Mar. 14, 2006

(54) CAPACITOR

(75) Inventors: Kazumi Naito, Chiba (JP); Kazuhiro Omori, Kanagawa (JP)

(73) Assignee: Showa Denka K.K., Tokyo (JP)

( * ) Notice: Subject to any disclaimer, the term of this patent is extended or adjusted under 35 U.S.C. 154(b) by 6 days.

(21) Appl. No.: 10/487,221

(22) PCT Filed: Aug. 21, 2002

(86) PCT No.: PCT/JP02/08407

§ 371 (c)(1),
(2), (4) Date: Feb. 20, 2004

(87) PCT Pub. No.: WO03/019592

PCT Pub. Date: Mar. 6, 2003

(65) Prior Publication Data

US 2004/0212948 A1 Oct. 28, 2004

Related U.S. Application Data

(60) Provisional application No. 60/314,670, filed on Aug. 27, 2001.

(30) Foreign Application Priority Data

Aug. 22, 2001 (JP) ........................................ 2001-251295

(51) Int. Cl.
*H01G 9/04* (2006.01)

(52) U.S. Cl. .................. 361/508; 361/516; 361/528
(58) Field of Classification Search ................. 361/502, 361/508–512, 516, 523, 524, 528–530, 532; 29/25.03
See application file for complete search history.

(56) References Cited

U.S. PATENT DOCUMENTS

| | | | |
|---|---|---|---|
| 4,646,197 A | | 2/1987 | Wong |
| 5,050,434 A | * | 9/1991 | Demisch .................. 73/335.04 |
| 5,171,379 A | | 12/1992 | Kumar et al. |
| 5,369,547 A | * | 11/1994 | Evans ......................... 361/516 |
| 6,215,652 B1 | * | 4/2001 | Yoshida et al. ............. 361/524 |
| 6,545,858 B1 | * | 4/2003 | Naito et al. ................. 361/510 |

FOREIGN PATENT DOCUMENTS

| | | |
|---|---|---|
| GB | 2 185 756 A | 7/1987 |
| JP | 55-74127 A | 6/1980 |
| JP | 7-63045 | 7/1995 |
| JP | 7-85461 | 9/1995 |
| JP | 2001-155963 | 6/2001 |
| JP | PB 2001-155963 * | 6/2001 |

OTHER PUBLICATIONS

International Search Report for PCT/JP02/08407 date Aug. 25, 2003.

International Preliminary Examination Report PCT/JP02/084707 dated Aug. 12, 2003.

* cited by examiner

*Primary Examiner*—Anthony Dinkins
(74) *Attorney, Agent, or Firm*—Sughrue Mion, PLLC

(57) ABSTRACT

A capacitor having a tantalum or tantalum alloy electrode as one of the electrodes with an outgoing lead wire composed of a novel niobium alloy. According to the present invention, a capacitor having good heat resistance property can be inexpensively provided without reducing the capacitance.

5 Claims, No Drawings

CAPACITOR

CROSS REFERENCE TO RELATED APPLICATIONS

This application is based on the provisions of 35 U.S.C. Article 111(a) with claiming the benefit of filing date of U.S. provisional application Ser. No. 60/314,670 filed on Aug. 27, 2001 under the provisions of 35 U.S.C. 111(b), pursuant to 35 U.S.C. Article 119(e)(1).

TECHNICAL FIELD

The present invention relates to a capacitor comprising a tantalum or tantalum alloy electrode as one of the electrodes, more specifically, the present invention relates to a capacitor using a novel construction material metal for the outgoing lead wire of the electrode.

BACKGROUND ART

Conventionally, a capacitor is composed of two electrodes and a dielectric material interposed between these electrodes. As one of the electrodes of such a capacitor (hereinafter referred to as "one part electrode"), an electrode comprising one member selected from tantalum, aluminum, niobium, titanium and an alloy of these metals is known. Among these, tantalum is preferred because a capacitor fabricated can have various good performances and a relatively small capacitor can be manufactured. To this electrode, one end of an outgoing lead wire for obtaining electrical connection to the outside is connected. In the vicinity of the lead wire connected part, a dielectric layer equal to the dielectric layer formed on the one part electrode is usually formed. The construction material of the lead wire is tantalum and the shape of the lead wire is usually a cylindrical fine line.

When the one part electrode is reduced in the mass, the mass of the outgoing lead wire occupying in the capacitor becomes large relatively to the electrode. The mass unit price of tantalum fine line is higher than the unit price of tantalum electrode and for the purpose of cost reduction of the capacitor, a material low in the unit price is demanded. Niobium comes under such a material.

The density of niobium is about a half the density of tantalum and the output of niobium is larger than tantalum, therefore, the mass unit price of niobium is expected to be a half or less that of tantalum. However, when niobium is used for the outgoing lead wire, some capacitors fabricated suffer from poor heat resistance property. An attempt has been made to increase the thickness of the dielectric material formed on the one part electrode in order to solve this problem. The fabricated capacitor is, however, disadvantageously reduced in the capacitance.

DISCLOSURE OF INVENTION

Accordingly, the object of the present invention is to provide a tantalum capacitor with good heat resistance without reducing the capacitance.

Under the above mentioned circumstances, the present inventors have made extensive investigations, and as a result thereof, the present inventors have found that when an outgoing lead wire composed of a niobium alloy is used, a capacitor suppressed from the reduction in capacitance and capable of exhibiting good heat resistance property can be obtained. The present invention has been accomplished based on this finding.

More specifically, the present invention comprises the following tantalum capacitors.

1. A capacitor comprising two electrodes at least one of which is composed of tantalum or an alloy thereof and a dielectric material interposed between these electrodes, wherein an outgoing lead wire connected to the electrode is composed of a niobium alloy.
2. The capacitor as described in the above item 1, wherein the niobium alloy is an alloy with at least one element selected from the elements belonging to Groups 2 to 16 of the periodic table.
3. The capacitor as described the above item 1 or 2, wherein the niobium alloy is a partially nitrided alloy.
4. The capacitor as described in the above item 3, wherein the nitrogen content of the partially nitrided niobium alloy is from 20 to 150,000 mass ppm.
5. The capacitor as described in any one of the above items 1 to 4, wherein the electrode connected with the outgoing lead wire has a sintered body structure and the CV value thereof is at least 40,000 (CV/g) or more.

The reasons why a capacitor of the present invention employing niobium alloy as material for its outgoing lead wire can obtain such excellent properties are not clearly known but can be presumed as follows.

As described above, the dielectric layer formed between the electrodes is also formed on a part of the outgoing lead wire connected to the electrode and when niobium is used as a construction material of the outgoing lead wire, niobium is more liable to extract oxygen contained in the dielectric layer formed on the outgoing lead wire, because niobium has a larger affinity to oxygen than tantalum. As a result, the dielectric layer formed in the vicinity of the connected portion including a part of the outgoing lead wire deteriorates in the performance to lower the heat resistance. When the construction material of the outgoing lead wire is a niobium alloy, the liability to extract oxygen from the dielectric layer is relieved because niobium as an alloy is already bonded or solid-solubilized to other element, so that the finally fabricated capacitor can be prevented from the deterioration in the heat resistance property.

DETAILED DESCRIPTION OF THE INVENTION

The capacitor of the present invention will be described in detail.

As the material for one part electrode for use in the present invention, at least one member selected from tantalum and alloys mainly comprising tantalum can be used.

The electrode may have a plate, foil or bar shape or may be a sintered body. The size can be freely selected by taking account of the capacitance of the capacitor fabricated. In the case of a foil or bar electrode, the surface area per unit volume may be increased by bending, coiling or surface-etching the electrode material. In the case of producing a sintered body, for example, a method of press-molding the above-described material in the powder form and then allowing the molded article to stand under the condition of $10^2$ to $10^{-4}$ Pa at 900 to 2,000° C. for several minutes to several hours may be used.

The niobium alloy used as the outgoing lead wire in the present invention may have a plate, foil or bar shape. The size is generally smaller than the size of the above-described electrode. One end of the outgoing lead wire and the electrode are electrically connected using welding, electrically conducting paste, caulking or press-bonding. In the case where a sintered body is used as the electrode, the outgoing lead wire may be electrically connected to the sintered electrode body, for example, by inserting a part of the outgoing lead wire into the metal powder at the press-molding and then sintering these together.

In the case of a sintered body, it is naturally possible to use the above-described method, namely, a method of connecting the outgoing lead wire to a sintered body produced from a molded article of only the metal powder, by welding or the like. Two or more outgoing lead wire may be connected to each electrode.

An alloy of niobium metal and other element can be easily produced by arc melting, electron beam melting or the like. In the present invention, an alloy of niobium metal and at least one element selected from the elements belonging to Groups 2 to 16 of the periodic table, preferably at least one element selected from the elements belonging to Groups 3 to 7 and Groups 13 to 16, more preferably at least one element selected from the elements belonging to Groups 3, 4, 6, 7 and 13 is prepared and the outgoing lead wire is produced from the alloy, whereby the fabricated capacitor can have good heat resistance.

The concentration of the element varies depending on the kind of element and the nitrided amount of alloy, which is described later, and therefore, is determined by previously performing a preliminary test, but the concentration of the element is usually from 300 to 100,000 mass ppm. The lead wire can be produced from the alloy, for example, by preparing a niobium alloy bar having an appropriate diameter and then forming it into a lead wire using a conventionally known wire drawing method. The niobium alloy bar can be obtained, for example, by appropriately rolling a niobium alloy ingot. The niobium alloy bar may also be obtained by a method where a niobium alloy powder is filled in a bar-form mold, pressed and then melt-integrated under electrical heating.

In the present invention, the niobium alloy may be partially nitrided before use. The timing of partially nitriding the niobium alloy may be at the time of niobium alloy before producing the outgoing lead wire or at the time of lead wire produced from the niobium alloy. A part of the niobium alloy or lead wire can be nitrided, for example, by nitriding the niobium alloy or lead wire in a nitrogen gas atmosphere. In this case, the nitrogen amount is preferably from 20 to 150,000 mass ppm. In order to obtain a capacitor more improved in the leakage current value, the nitrogen amount is more preferably from 100 to 30,000 mass ppm.

The nitridation can be performed by any one of liquid nitridation, ion nitridation and gas nitridation or by a combination thereof. Among these, the gas nitridation treatment by a nitrogen gas atmosphere is preferred, because the apparatus is simple and the operation is easy. For example, the gas nitridation by a nitrogen gas atmosphere is achieved by, allowing the niobium alloy or lead wire to stand in a nitrogen atmosphere. With a nitridation atmosphere temperature of 2,000° C. or less and a standing time of several hours, a niobium alloy or lead wire having an objective nitrided amount can be obtained. By performing the treatment at a high temperature, the treatment time can be shortened. The nitrided amount of the niobium alloy or lead wire can be controlled by the conditions of nitridation temperature and nitridation time of the material to be nitrided, which are confirmed by a preliminary test or the like.

In another method for obtaining the outgoing lead wire of the present invention, an outgoing lead wire precursor having a long length and/or a wide width is prepared and at the connection to the electrode or in the case where the electrode is a sintered body, for example, at the time of inserting the lead wire before press-molding the metal powder of giving the electrode, the precursor may be cut into an appropriate length and/or size to obtain the objective outgoing lead wire.

The concentration of impurity elements other than niobium, oxygen, nitrogen and alloy-forming metal elements, contained in the outgoing lead wire composed of the niobium alloy of the present invention is 300 mass ppm or less, preferably 100 mass ppm or less. If the concentration of impurity elements exceeds 300 mass ppm, the capacitor fabricated using the outgoing lead wire composed of the niobium alloy may suffer from failure in performance and this is not preferred. The amount of oxygen contained in the outgoing lead wire is usually from 10 to 3,000 mass ppm, though this varies depending on the size of the outgoing lead wire. The oxygen is added mainly due to natural oxidation in air.

The outgoing lead wire composed of the niobium alloy may also be connected after the electrode for use in the present invention is previously formed into a partially nitrided electrode. One example of the method for producing the partially nitrided electrode is the nitridation treatment method used above for partially nitriding the niobium alloy. The nitridation can be performed by any one of liquid nitridation, ion nitridation and gas nitridation or by a combination thereof. Among these, the gas nitridation treatment by a nitrogen gas atmosphere is preferred because the apparatus is simple and the operation is easy. The electrode for use in the present invention preferably has a structure of a sintered body having a CV value of at least 40,000 (CV/g) or more, preferably 50,000 (CV/g) or more, because a large-capacitance capacitor can be obtained. This CV value can be obtained, for example, by producing a secondary particle using a powder material having an average primary particle size of 0.6 to 1 $\mu$m. By reducing the average particle size of the primary particle used for producing a sintered body, a larger CV value can be obtained. The average primary particle size is reduced, for example, to from 0.2 to 0.5 $\mu$m for obtaining a CV value of 60,000 to 140,000 (CV/g), and to less than 0.2 $\mu$m for obtaining a CV value of 150,000 (CV/g) or more, whereby a sintered body having a larger CV value necessary for obtaining a capacitor having a larger capacitance can be produced.

The tantalum powder having such an average particle size can be obtained, for example, by reducing potassium fluorotantalate with sodium, by grinding and dehydrogenating a hydride of tantalum ingot, by reducing tantalum chloride with carbon or metal, or the like. For example, in the case of obtaining the tantalum powder by the reduction of potassium fluorotantalate with sodium, a tantalum powder having a desired average particle size can be obtained by controlling the concentration of the starting material or the concentration of a sodium salt used as a catalyst. By granulating this tantalum powder, a secondary particle tantalum powder having an average particle size of 10 to 1,000 $\mu$m can be produced. The thus-obtained secondary particle tantalum powder is used as a powder material for the production of a sintered body.

In the case of nitriding a part of the powder material for capacitors, the nitrogen amount is from hundreds mass ppm to tens of thousands mass ppm. With a nitrogen amount in this range, the sintered body produced from the powder material for capacitors can exhibit a good leakage current value (LC value) without reducing the capacitance and therefore, a capacitor having a small leakage current value can be obtained without causing reduction in capacitance. The nitrogen amount of the powder material for capacitors as used herein means the amount of nitrogen not adsorbed but infallibly bonded to the material.

A partially nitrided electrode can also be obtained by using a method of producing a sintered body and then nitriding the sintered body. For example, a tantalum powder is molded and then sintered and the resulting sintered body is nitrided by the above-described nitridation treatment method. In this case, the lead wire connected to the electrode can be nitrided together and the process can be simplified.

As the dielectric material of the capacitor of the present invention, for example, tantalum oxide, a polymer substance such as polyparaxylene, or a ceramic compound such as barium titanate, can be used. In the case of a dielectric material mainly comprising tantalum oxide, the tantalum oxide can be produced by chemically forming the tantalum, tantalum alloy or a partially nitrided product thereof as one part electrode in an electrolytic solution or by attaching a tantalum-containing complex such as alkoxy complex or acetyl acetonate complex to the electrode and water decomposing and/or thermally decomposing the complex.

The formation of a dielectric material using a polymer substance or a ceramic compound can be performed by the method described in JP-B-7-63045 (the term "JP-B" as used herein means an "examined Japanese Patent publication") and JP-B-7-85461. A film of polymer substance or ceramic compound can be formed on one part electrode by the reaction or the like.

Out of these methods for forming a dielectric material, when the dielectric material is obtained by the chemical forming in an electrolytic solution, the capacitor of the present invention is an electrolytic capacitor and the chemically formed electrode side serves as an anode. When the dielectric material is obtained by the decomposition of a complex, the electrode attached with the complex theoretically has no polarity and can be used as either of anode and cathode.

Among these dielectric layers and methods for forming the dielectric layer, a method of chemically forming an electrode composed of tantalum, a tantalum alloy or a partially nitrided product thereof in an electrolytic solution and forming tantalum oxide (mainly ditantalum pentoxide) as a dielectric material on the electrode is preferred because the workability is good and the fabricated capacitor has a large capacitance. Use of a nitrided tantalum or tantalum alloy is more preferred because the leakage current value is small and the reliability is high.

In the capacitor of the present invention, another part electrode (counter electrode) coupled with the tantalum sintered body is not particularly limited. For example, at least one material (compound) selected from electrolytic solutions, organic semiconductors and inorganic semiconductors known in the art of aluminum electrolytic capacitor may be used.

Specific examples of the electrolytic solution include a dimethylformamide-ethylene glycol mixed solution having dissolved therein 5 mass % of an isobutyltripropylammonium borotetrafluoride electrolyte, and a propylene carbonate-ethylene glycol mixed solution having dissolved therein 7 mass % of tetraethylammonium borotetrafluoride.

Specific examples of the organic semiconductor include an organic semiconductor comprising a benzenepyrroline tetramer and chloranile, an organic semiconductor mainly comprising tetrathiotetracene, an organic semiconductor mainly comprising tetracyanoquinodimethane, and an electrically conducting polymer comprising a repeating unit represented by the following formula (1) or (2):

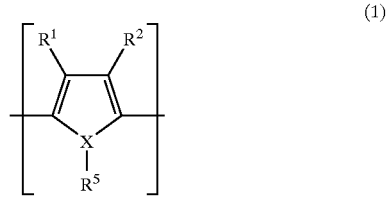

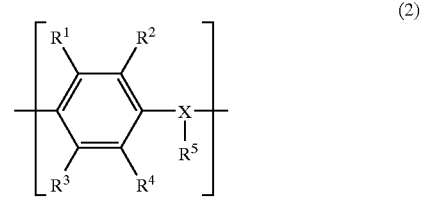

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$ and/or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently represents preferably a hydrogen atom or a linear or branched, saturated or unsaturated alkyl or alkoxy group having from 1 to 6 carbon atoms, and each of the pairs $R^1$ and $R^2$ and/or $R^3$ and $R^4$ may combine to form a ring.

In the present invention, the electrically conducting polymer containing a repeating unit represented by formula (1) is preferably an electrically conducting polymer containing a structure unit represented by the following formula (3) as a repeating unit:

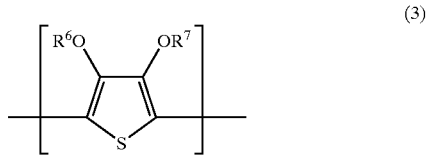

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure bears electrical charge and is doped with a dopant. For the dopant, known dopants can be used without limitation.

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S/cm, the fabricated capacitor can have a smaller impedance value and can be more increased in the capacitance at a high frequency.

In the case where the another part electrode is solid, an electrically conducting layer may be provided thereon so as to attain good electrical contact with an external terminal (for example, lead frame).

The electrically conducting layer can be formed using, for example, solidification of an electrically conducting paste, plating, vapor deposition of metal or formation of a heat-resistant electrically conducting resin film. Preferred examples of the electrically conducting paste include silver paste, copper paste, aluminum paste, carbon paste and nickel paste. These pastes may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

Specifically, for example, carbon paste and silver paste are stacked in this order on the counterelectrode (hereinafter referred to as "the other part electrode") and these are molded with a material such as epoxy resin, whereby a capacitor is fabricated. At this time, for obtaining electrical connection from the inside of the epoxy resin toward the outside, one end of the outgoing lead wire (the other end is connected to the one part electrode) may be electrically connected, for example, with one end of a separately prepared external terminal within the outer jacket. That is, the outgoing lead wire composed of a niobium alloy may be connected between the one part electrode and an external terminal.

The thus-fabricated capacitor of the present invention is jacketed using, for example, resin mold, resin case, metallic jacket case, dipping of resin or laminate film, and then used as a capacitor product for various uses.

In the case where the other part electrode is liquid, the capacitor fabricated from the above-described two electrodes and dielectric material is housed, for example, in a can electrically connected to the other part electrode to complete the capacitor. In this case, the electrode side where the outgoing lead wire composed of a niobium alloy is connected is guided outside through the outgoing lead composed of a niobium alloy and at the same time, insulated from the can using an insulating rubber or the like. It is also possible that the outgoing lead wire composed of a niobium alloy, which is connected to the electrode, is cut at an appropriate position and then connected to one end of a separately prepared external terminal and the external terminal is guided outside.

Also, the other end of the outgoing lead wire, which is not connected to the electrode, may be directly pulled out to the outside of the jacket without using an external terminal. Alternatively, an external terminal may be directly connected to the other part electrode without using an outgoing lead wire.

The capacitor of the present invention fabricated as such using an outgoing lead wire composed of a niobium alloy can have good heat resistance without causing reduction in the capacitance of the capacitor.

BEST MODE FOR CARRYING OUT THE INVENTION

The present invention will be more specifically described by way of non-limiting examples as below.

The nitrogen and oxygen contents of the niobium alloy, the outgoing lead wire composed of a niobium alloy, and the one part electrode were determined using a nitrogen-oxygen analyzer manufactured by LEKO Co., Ltd. As for the composition of niobium alloy, Si and P were determined by ICP-AES, C and S were determined by high-frequency combustion/IR, and other elements were determined by ICP-AES.

The capacitance of the capacitor was measured by LCR Meter manufactured by Hulette-Packard Co., Ltd.

As the index for heat resistance, out of 50 units of each capacitor fabricated, the number of units showing a leakage current (hereinafter simply referred to as an "LC value") of 0.05 CV value (a product of capacitance and rated voltage) or less when measured by connecting the capacitor to a previously prepared substrate in a reflow furnace is used. When the substrate is charged into the reflow furnace, the temperature at the external terminal part of capacitor was kept at 230° C. for 30 seconds per one charging into the reflow furnace and the substrate was charged three times.

EXAMPLES 1 TO 43 AND COMPARATIVE EXAMPLES 1 TO 4

Manufacture of Niobium Alloy Wire

An alloy component(s) shown in Tables 1 and 2 was added to niobium and then, a niobium alloy was produced by the arc melting method for Examples 1 to 19 in Table 1 and Examples 20 to 43 in Table 2. The niobium alloy was rolled and extruded to manufacture a 5-mm niobium alloy wire. The operation of reducing the wire diameter using a die was repeated and then a niobium alloy wire having an objective wire diameter of 0.4 mmφ was taken up. This 0.4-mmφ niobium alloy wire was used as the outgoing lead wire composed of a niobium alloy in the following fabrication of capacitor. In Table 2, data of alloy wire partially nitrided by allowing the alloy wire to stand in a nitrogen atmosphere at 800° C. are also shown for Examples 41 to 43.

TABLE 1

| Example | Composition | (unit: mass ppm) |
|---------|-------------|------------------|
| 1 | Mg | 750 |
| 2 | Y | 1200 |
| 4 | Zr | 1800 |
| 5 | Hf | 6300 |
| 6 | V | 1500 |
| 7 | Mo | 1000 |
| 8 | W | 2600 |

TABLE 1-continued

| Example | Composition | (unit: mass ppm) |
|---|---|---|
| 9 | Mn | 580 |
| 10 | Re | 1400 |
| 11 | Nd | 550 |
| 12 | Fe | 600 |
| 13 | Ru | 750 |
| 14 | Co | 550 |
| 15 | Ir | 800 |
| 16 | Ni | 670 |
| 17 | Pt | 590 |
| 18 | Ag | 770 |
| 19 | Zn | 600 |

TABLE 2

| Example | Composition (unit: mass ppm) | | | | | | |
|---|---|---|---|---|---|---|---|
| 20 | B | 1500 | | | | | |
| 21 | Al | 800 | | | | | |
| 22 | In | 580 | | | | | |
| 23 | Si | 650 | | | | | |
| 24 | Sn | 870 | | | | | |
| 25 | Pb | 690 | | | | | |
| 26 | Sb | 880 | | | | | |
| 27 | Bi | 1500 | | | | | |
| 28 | S | 620 | | | | | |
| 29 | Se | 770 | | | | | |
| 30 | Ta | 1200 | | | | | |
| 31 | Y | 520 | Ti | 510 | | | |
| 32 | Zr | 630 | Fe | 440 | | | |
| 33 | Hf | 740 | Ni | 480 | | | |
| 34 | W | 600 | Zn | 510 | | | |
| 35 | Re | 760 | Al | 880 | | | |
| 36 | B | 670 | Co | 440 | | | |
| 37 | Zr | 600 | B | 400 | | | |
| 38 | Ra | 510 | B | 420 | Hf | 450 | |
| 39 | Zr | 570 | Mn | 460 | Ta | 10000 | |
| 40 | W | 480 | Mo | 440 | Ta | 24000 | |
| 41 | B | 530 | N | 2300 | | | |
| 42 | Zr | 610 | N | 3800 | | | |
| 43 | Zr | 520 | Zn | 460 | N | 550 | |

In the thus-produced 0.4-mmφ niobium alloy wires, the concentration of impurity elements other than niobium, oxygen, nitrogen and alloy-forming metal element(s) is 100 mass porn or less.

Fabrication of Capacitor

From 0.15 g of a tantalum powder (secondary particle, CV: 50,000/g) having an average particle size of 135 μm and a 10-mm outgoing lead wire cut out from each niobium alloy wire shown in Tables 1 and 2, a molded article having a size of 4.0×3.5×1.7 mm (3 mm of the outgoing lead wire was inserted inside the molded article) was produced. Each molded article was sintered at 1,350° C. for 30 minutes to obtain a sintered body. The sintered body was chemically formed in an aqueous 0.1% phosphoric acid solution at 80° C. for 5 hours with a voltage of 42 V to form an oxide dielectric film layer composed of tantalum oxide on the surface including the pore part of the sintered body. Then, the sintered bodies having thereon an oxide dielectric film layer, produced from each alloy wire shown in Tables 1 and 2 and tantalum powder, were divided in the order shown in Tables into 4 groups and subjected to 4 kinds of semiconductor formation methods shown in Table 3, respectively, to form a semiconductor layer on the oxide dielectric film. Subsequently, a carbon paste layer and a silver paste layer were sequentially stacked to fabricate a capacitor device. Each capacitor device was placed on two projected parts of a lead flame as a separately prepared external terminal. To respective two projected parts, the silver past side was connected by an electrically conducting adhesive composed of silver paste and the outgoing lead wire side was connected by spot welding. Thereafter, the device was sealed with epoxy resin to fabricate a chip-type capacitor (size: 7.3× 4.3×2.8 mm). The capacitance at 120 Hz and the LC value at 10 V of each capacitor fabricated and the number of units exhibiting an LC value of 0.05 CV or less after the heat resistance test performed by the above-described method are shown together in Tables 4 and 5. For the capacitor of each Example, 50 units were manufactured. In Tables 4 and 5, the value of a capacitor using a niobium wire but not a niobium alloy wire is shown as Comparative Examples 1 to 4.

TABLE 3

| Example Applied | The Other Part Electrode | Method for Forming the Other Part Electrode |
|---|---|---|
| Example 1 to 10 Comparative Example 1 | Polypyrrole doped with anthraquinonesulfonate | Oxidation reaction in pyrrole gas was repeated. |
| Example 11 to 21 Comparative Example 2 | Manganese dioxide | Thermal decomposition of manganese nitrate was repeated. |
| Example 22 to 33 Comparative Example 3 | Polythiophene derivative doped with anthraquinonesulfonate | Oxidation reaction in thiophene derivative solution was repeated |
| Example 34 to 43 Comparative Example 4 | Mixture of lead dioxide and lead sulfate (lead dioxide: 98 mass %) | Oxidation reaction in aqueous lead acetate solution was repeated. |

TABLE 4

| | C (μF) | LC (μA) | Number of Units of 0.05 CV or less |
|---|---|---|---|
| Example 1 | 152 | 3 | 50 |
| 2 | 150 | 2 | 50 |
| 3 | 155 | 4 | 50 |
| 4 | 152 | 5 | 50 |
| 5 | 150 | 1 | 50 |
| 6 | 151 | 2 | 50 |
| 7 | 154 | 1 | 50 |
| 8 | 150 | 2 | 50 |
| 9 | 155 | 3 | 50 |
| 10 | 152 | 2 | 50 |
| Comparative Example 1 | 153 | 25 | 14 |
| Example 11 | 163 | 2 | 50 |
| 12 | 163 | 3 | 50 |
| 13 | 164 | 1 | 50 |
| 14 | 160 | 1 | 50 |
| 15 | 166 | 2 | 50 |
| 16 | 163 | 3 | 50 |
| 17 | 165 | 5 | 50 |
| 18 | 160 | 1 | 50 |
| 19 | 163 | 2 | 50 |
| 20 | 163 | 2 | 50 |
| 21 | 162 | 3 | 50 |
| Comparative Example 2 | 165 | 14 | 44 |

TABLE 5

| | C (μF) | LC (μA) | Number of Units of 0.05 CV or less |
|---|---|---|---|
| Example 22 | 156 | 3 | 50 |
| 23 | 153 | 4 | 50 |
| 24 | 157 | 2 | 50 |
| 25 | 158 | 2 | 50 |
| 26 | 156 | 4 | 50 |
| 27 | 159 | 4 | 50 |
| 28 | 158 | 3 | 50 |

TABLE 5-continued

|  | C (μF) | LC (μA) | Number of Units of 0.05 CV or less |
|---|---|---|---|
| 29 | 155 | 1 | 50 |
| 30 | 157 | 4 | 50 |
| 31 | 156 | 5 | 50 |
| 32 | 157 | 4 | 50 |
| 33 | 156 | 2 | 50 |
| Comparative Example 3 | 157 | 22 | 20 |
| Example 34 | 160 | 1 | 50 |
| 35 | 160 | 2 | 50 |
| 36 | 159 | 1 | 50 |
| 37 | 158 | 3 | 50 |
| 38 | 161 | 1 | 50 |
| 39 | 159 | 2 | 50 |
| 40 | 160 | 2 | 50 |
| 41 | 162 | 1 | 50 |
| 42 | 158 | 3 | 50 |
| 43 | 161 | 1 | 50 |
| Comparative Example 4 | 160 | 16 | 43 |

On comparison of Examples with Comparative Example in Tables 4 and 5, it is seen that capacitors using an outgoing lead wire composed of a niobium alloy have good heat resistance property.

INDUSTRIAL APPLICABILITY

According to the present invention, a capacitor having good heat resistance property can be inexpensively provided without reducing the capacitance by using an outgoing lead wire composed of a niobium alloy in a capacitor comprising a tantalum or tantalum alloy electrode as one of the electrodes.

What is claimed is:

1. A capacitor comprising two electrodes at least one of which is composed of tantalum or an alloy thereof and a dielectric material interposed between these electrodes, wherein an outgoing lead wire connected to the electrode is composed of a niobium alloy.

2. The capacitor as claimed in claim 1, wherein the niobium alloy is an alloy with at least one element selected from the elements belonging to Groups 2 to 16 of the periodic table.

3. The capacitor as claimed in claim 1, wherein the niobium alloy is a partially nitrided alloy.

4. The capacitor as claimed in claim 3, wherein the nitrogen content of the partially nitrided niobium alloy is from 20 to 150,000 mass ppm.

5. The capacitor as claimed in claims 1, wherein the electrode connected with the outgoing lead wire has a sintered body structure and the CV value thereof is at least 40,000 (CV/g) or more.

* * * * *